(12) United States Patent
Lee et al.

(10) Patent No.: US 12,304,265 B2
(45) Date of Patent: May 20, 2025

(54) DRIVING APPARATUS AND OPERATION METHOD THEREOF

(71) Applicant: SEMES CO., LTD., Chungcheongnam-do (KR)

(72) Inventors: Seung Chan Lee, Gyeonggi-do (KR); Sang Ok Park, Gyeonggi-do (KR)

(73) Assignee: SEMES CO., LTD., Chungcheongnam-do (KR)

( * ) Notice: Subject to any disclaimer, the term of this patent is extended or adjusted under 35 U.S.C. 154(b) by 254 days.

(21) Appl. No.: 18/108,014

(22) Filed: Feb. 10, 2023

(65) Prior Publication Data
US 2024/0157747 A1    May 16, 2024

(30) Foreign Application Priority Data
Nov. 11, 2022    (KR) ........................ 10-2022-0150563

(51) Int. Cl.
*B60G 17/0165* (2006.01)
*B60L 15/20* (2006.01)
*G05D 1/00* (2024.01)

(52) U.S. Cl.
CPC .......... *B60G 17/0165* (2013.01); *B60L 15/20* (2013.01); *B60G 2400/0511* (2013.01);
(Continued)

(58) Field of Classification Search
CPC ......... G05D 1/243; G05D 1/0088; B25J 9/00; B60G 17/0165; A01B 69/008;
(Continued)

(56) References Cited

U.S. PATENT DOCUMENTS

| 2008/0249690 A1* | 10/2008 | Matsumoto | ............. F16F 15/02 180/69.6 |
| 2018/0154723 A1* | 6/2018 | Anderson | ............... F16F 9/512 |

(Continued)

FOREIGN PATENT DOCUMENTS

| CN | 204027587 U | * 12/2014 | ............. F16H 25/22 |
| CN | 205853807 | 1/2017 | |

(Continued)

OTHER PUBLICATIONS

Office Action dated Apr. 30, 2024 for Korean Patent Application No. 10-2022-0150563 and its English translation from Global Dossier.
(Continued)

*Primary Examiner* — Yuri Kan
(74) *Attorney, Agent, or Firm* — WOMBLE BOND DICKINSON (US) LLP (57) ABSTRACT

Provided are a driving apparatus and an operating method thereof. The driving apparatus includes a body part; driving parts configured to drive the body part along a driving route; actuating parts configured to provide an actuation force to the driving parts to drive the body part; and an information collection part configured to collect vibration information on vibrations produced on the driving route according to driving of the driving parts, wherein the information collection part is configured to provide vibration cancellation information for canceling the vibration information on the basis of the vibration information and a plurality of driving parts are provided on the body part and perform a first response operation in the body part to respond to the vibrations on the driving route on the basis of the vibration cancellation information.

20 Claims, 7 Drawing Sheets

(52) U.S. Cl.
CPC ............... *B60G 2400/0512* (2013.01); *B60G 2400/0513* (2013.01); *G05D 1/021* (2013.01)

(58) Field of Classification Search
CPC .............. G06V 20/58; B60W 50/0098; B60W 30/182; F16F 9/512; F16F 15/02; F24F 13/24; A01D 46/26; F16H 25/22
See application file for complete search history.

(56) References Cited

U.S. PATENT DOCUMENTS

| | | | |
|---|---|---|---|
| 2019/0193721 A1* | 6/2019 | Yamamuro | B60W 30/182 |
| 2019/0193722 A1* | 6/2019 | Yamamuro | G05D 1/0088 |
| 2019/0250612 A1* | 8/2019 | Yamamuro | B60W 50/0098 |
| 2020/0029490 A1* | 1/2020 | Bertucci | G06V 20/58 |
| 2021/0000006 A1* | 1/2021 | Ellaboudy | A01B 69/008 |
| 2022/0134833 A1* | 5/2022 | Furuta | B60G 17/0165 |
| | | | 701/37 |
| 2023/0311605 A1* | 10/2023 | Lee | B25J 9/00 |
| | | | 280/5.514 |

FOREIGN PATENT DOCUMENTS

| | | | | |
|---|---|---|---|---|
| CN | 113405184 A | * | 9/2021 | ............. F24F 13/24 |
| KR | 10-2014-0076351 | | 6/2014 | |
| KR | 10-2014-0125166 | | 10/2014 | |
| KR | 10-2019-0072504 | | 6/2019 | |
| KR | 10-2020-0040547 | | 4/2020 | |
| KR | 10-2022-0012921 | | 2/2022 | |
| KR | 10-2022-0104387 | | 7/2022 | |
| RU | 2777467 C1 | * | 8/2022 | ............. A01D 46/26 |
| WO | 2022/055002 | | 3/2022 | |

OTHER PUBLICATIONS

Notice of Allowance dated Aug. 19, 2024 for Korean Patent Application No. 10-2022-0150563 and its English translation from Global Dossier.

* cited by examiner

DRIVING APPARATUS AND OPERATION METHOD THEREOF

CROSS-REFERENCE TO RELATED APPLICATION

This application claims priority from Korean Patent Application No. 10-2022-0150563 filed on Nov. 11, 2022 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a method of operating a driving apparatus.

2. Description of the Related Art

As robot technologies have advanced, autonomous driving-based transportation using various sensors (e.g., LiDAR sensor and the like) is being carried out. In this regard, autonomous-driving robots are driven in various driving routes. In general, these driving robots rely only on mechanical spring dampers or the like, and consideration has not been focused on controlling elements. Thus, it is not easy to effectively respond to a driving route and perform stable driving.

SUMMARY

Aspects of the present disclosure enable a driving apparatus to actively respond to a state of a driving route during driving.

In particular, driving optimized for the ground condition of a driving route is enabled to cancel shocks produced during driving.

Further, aspects of the present disclosure enable driving at various speeds ranging from low speed to high speed.

Moreover, even in the event of an unforeseen irregular obstacle, a quick response to such an event is enabled and thus stable driving is possible while responding to unexpected circumstances.

Furthermore, aspects of the present disclosure implements a structure specialized to prevent physical interference with other components caused by adjustable operations (e.g., rolling, yawing, pitching, etc.) of a driving means for shock cancellation during driving of a driving apparatus.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a driving apparatus including a body part; driving parts configured to drive the body part along a driving route; actuating parts configured to provide an actuation force to the driving parts to drive the body part; and an information collection part configured to collect vibration information on vibrations produced on the driving route according to driving of the driving parts, wherein the information collection part is configured to provide vibration cancellation information for canceling the vibrations produced on the driving route based on the vibration information and a plurality of driving parts are provided on the body part and perform a first response operation in the body part to respond to the vibrations on the driving route on the basis of the vibration cancellation information.

According to another aspect of the present disclosure, there is provided a driving apparatus including a body part; driving parts configured to drive the body part along a driving route; actuating parts configured to provide an actuation force to the driving parts to drive the body part; and an information collection part configured to collect vibration information on vibrations produced on the driving route according to driving of the driving parts, wherein the information collection part is configured to provide vibration cancellation information to cancel the vibrations and a plurality of driving parts are provided on the body part and perform a first response operation in the body part to respond to the vibrations on the driving route on the basis of the vibration cancellation information, wherein the information collection part is configured to collect three-dimensional vibration information as the vibration information, collect the vibration information at a preset period, and generate the vibration cancellation information, wherein at least four driving parts are provided in the body part and individually move to perform the first response operation based on the vibration cancellation information in order to reduce the vibrations produced on the driving route, wherein the actuating parts are configured to provide a torque-based actuation force and the driving parts are in contact with a ground of the driving route, change their positions based on the actuation force, and each include an in-wheel motor module configured to interwork with the actuating part, wherein the driving parts are configured to perform a first adjustable operation, including a rolling operation, a yawing operation, and a pitching operation, based on the actuation force of the actuating parts and the in-wheel motor module performs a second adjustable operation corresponding to the first adjustable operation on the basis of the vibration cancellation information provided by the information collection part, wherein the information collection part is configured to generate the vibration cancellation information that includes a machine learning-based algorithm in order to correspond to the vibration information and the actuating parts are configured to provide the actuation force such that the first adjustable operation of the driving parts is performed based on the vibration cancellation information, wherein the body part includes a plurality of hollow regions, the driving parts are located in the hollow regions and perform the first adjustable operation and the second adjustable operation, and the driving parts each include a panel unit in which the actuating part is located, a first contact unit provided on one side of the panel unit to be connected to the driving part and provided in the form of a universal joint, and a second contact unit provided on an opposite side of the panel unit to be connected to the driving part and provided in the form of a universal joint, wherein the driving parts each include a connection block configured to interwork with the in-wheel motor module and a moving shaft unit configured to vertically move the connection block using a ball-screw mechanism based on the actuation force of the actuating parts, a spring unit is provided on an outer circumferential surface of the moving shaft unit, and the spring unit is located between the panel unit and the connection block, contracts and enters a compressed state as the connection block moves upward of the moving shaft unit, and is in a relaxed state through its elasticity as the connection block moves downward of the moving shaft part based on the actuation force of the actuating part, wherein when the actuating part moves the connection block and the in-wheel motor module downward, the spring unit assists in the downward movement based on the relaxed state due to elasticity, wherein the driving parts each further include a movement restricting body including a vertical connection unit is connected to and located below the panel unit and a horizontal connection unit extending horizontally from the vertical connection unit and installed on a lower end of the moving shaft unit to restrict the movement of the connection block, wherein the driving apparatus further includes a vision sensor module configured to, in an event of occurrence of an unforeseen irregular obstacle on the driving route during driving of the driving apparatus, predict an impact value produced by the irregular obstacle and generate obstacle impact information, wherein the information collection part is configured to provide vibration cancellation information based on the obstacle impact information and the driving parts perform a second response operation for shock reduction corresponding to the irregular obstacle based on the vibration cancellation information, wherein the second response operation of the driving parts includes a 2-1 response operation in which the in-wheel motor module approaches the body part based on the compressed state and a 2-2 operation in which the in-wheel motor module moves away from the body part based on the compressed state, wherein the body part includes a lower plate unit, one or more support bodies on the lower plate unit, and an upper plate unit provided above the lower plate unit via the support bodies and the driving parts are disposed on edge portions of the lower plate unit, respectively.

According to still another aspect of the present disclosure, there is provided a method of operating a driving apparatus, including preparing a driving apparatus to drive and driving the driving apparatus along a driving route, wherein the driving apparatus includes a body part; driving parts configured to drive the body part along a driving route; actuating parts configured to provide an actuation force to the driving parts to drive the body part; and an information collection part configured to collect vibration information on vibrations produced on the driving route according to driving of the driving parts, wherein the information collection part is configured to provide vibration cancellation information for canceling the vibrations produced on the driving route based on the vibration information and a plurality of driving parts are provided on the body part and perform a first response operation in the body part to respond to the vibrations on the driving route on the basis of the vibration cancellation information.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Exemplary, non-limiting advantages and features may be understood more readily by reference to the following detailed description of exemplary embodiments and the accompanying drawings. Apparatuses and methods may, however, be embodied in many different forms and should not be construed as being limited to the exemplary embodiments set forth herein. Rather, these exemplary embodiments are provided so that this disclosure will be thorough and complete and will fully convey the concept of the exemplary embodiments to those skilled in the art, and the exemplary embodiments will only be defined by the appended claims. Like reference numerals refer to like elements throughout the specification.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

It will be understood that, although the terms "first", "second", etc. may be used herein to describe various elements, components, regions, layers mod/or sections. These elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements mod/or components, hut do not preclude the presence or addition of one or more other features, integers, steps, operations, elements, components and/or groups thereof. Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Embodiments of the present disclosure will be described below in detail with reference to the accompanying drawings where those components are rendered the same reference number that are the same or are in correspondence, regardless of the figure number, and redundant explanations are omitted.

Figure 1:
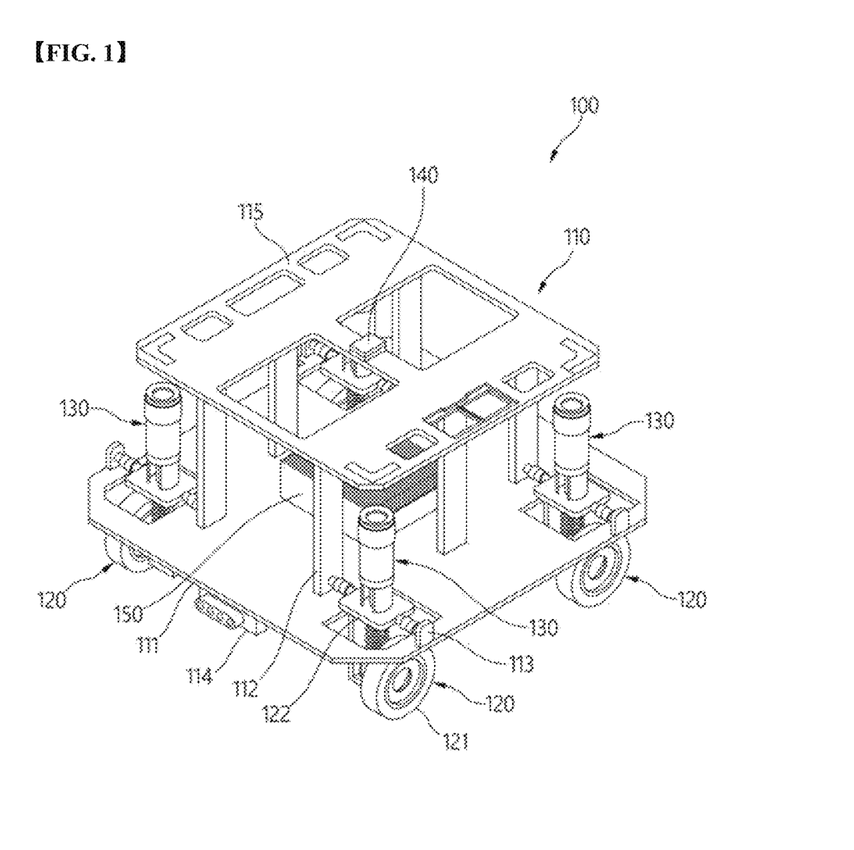
FIG. 1 is a perspective view showing configurations of a traveling device according to an embodiment of the present disclosure.

Referring to FIG. 1, a driving apparatus 100 according to an embodiment of the present disclosure includes a body part 110, driving parts 120, actuating parts 130, an information collection part 140, and a control part 150.

Figure 2:
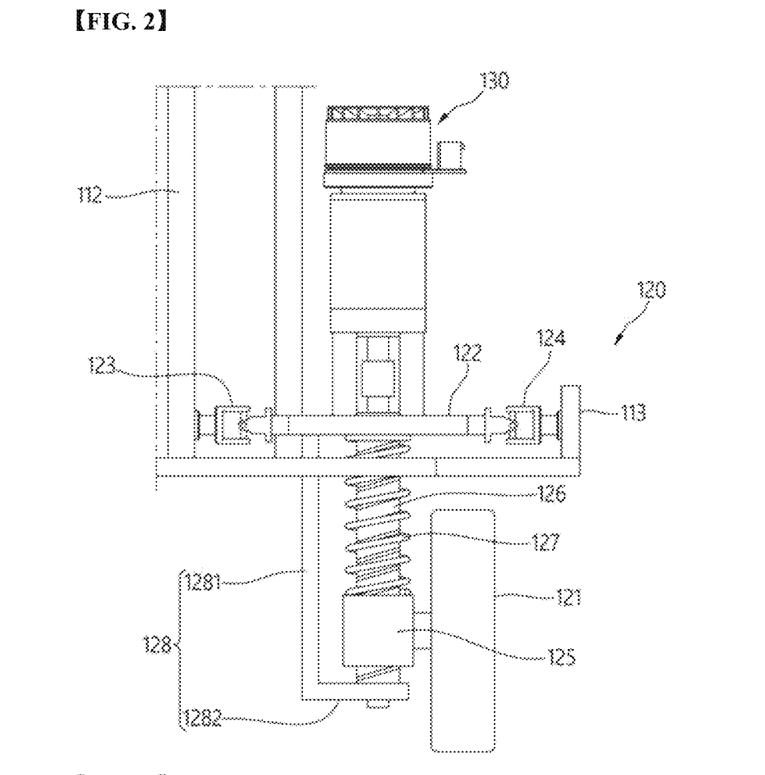
FIG. 2 is a view showing a detailed configuration according to FIG. 1.

Referring to FIG. 2, each of the driving parts120 includes an in-wheel motor module 121, a panel unit 122, a first contact unit 123, a second contact unit 124, a connection block 125, a moving shaft unit 126, a spring unit 127, and a movement restricting body 128. The movement restricting body 128 includes a vertical connection unit 1281 and a horizontal connection unit 1282.

Further, the body part 110 of the driving apparatus 100 is operated within a line for handling distribution of a semiconductor substrate or the like. The driving parts 120 of the driving apparatus 100 are provided on the body part 110 to drive the body part 110 along a driving route.

The actuating parts 130 of the driving apparatus 100 provides an actuation force to the driving parts 120 to drive the body part 110. The information collection part 140 of the driving apparatus 100 collects vibration information on vibrations produced on the driving route according to the driving of the driving parts 120.

Here, the information collection part 140 provides vibration cancellation information to cancel the vibrations produced on the driving route based on the vibration information. A plurality of driving parts 120 are provided on the body part 110.

The driving parts 120 perform a first response operation in the body part 110 to respond to the vibrations on the driving route on the basis of the vibration cancellation information. The actuating parts 130 provide a torque-based actuation force.

Also, the in-wheel motor module 121 of the driving part 120 is in contact with the ground on the driving route. The in-wheel motor module 121 changes the position of the driving part 120 based on the actuation force.

Figure 3:
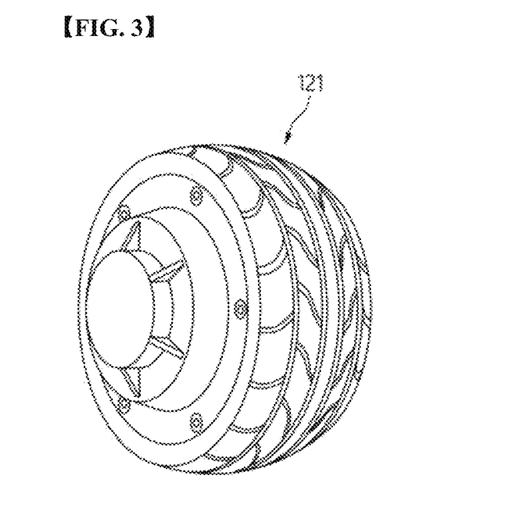
FIGS. 3 to 5 are views showing types of configuration according to FIG. 1.
Figure 4:
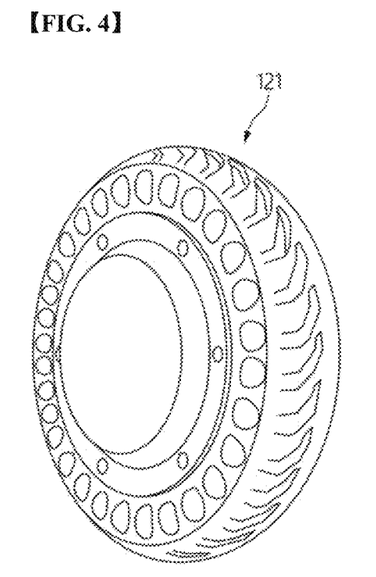
Figure 5:
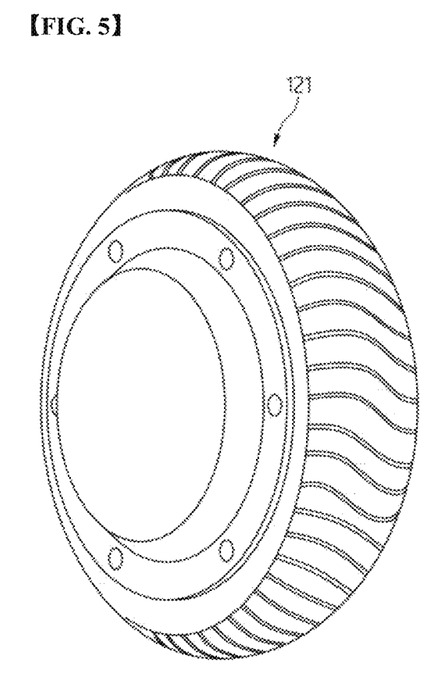

Referring to FIGS. 2 and 3, the in-wheel motor module 121 is provided in various standards and forms in response to the driving route and the weight and size of a product to be loaded. The in-wheel motor module 121 interworks with the actuating part 130.

Referring to FIG. 2, the driving parts 120 perform a first adjustable operation. The adjustable operation includes, for example, a rolling operation, a yawing operation, a pitching operation, and the like based on the actuation force of the actuating part 130.

In addition, the in-wheel motor module 121 performs a second adjustable operation that corresponds to the first adjustable operation. For example, the second adjustable operation is performed based on the vibration cancellation information provided by the information collection part 140.

The information collection part 140 generates the vibration cancellation information to include a machine learning-based algorithm in order to correspond to the vibration information. The actuating parts 130 provide an actuation force such that the first adjustable operation of the driving parts 120 is performed based on the vibration cancellation information.

Here, the body part 110 includes a plurality of hollow regions. The driving parts 120 are positioned in the hollow regions and perform the first adjustable operation and the second adjustable operation.

Each of the actuation parts 130 is positioned on the panel unit 122 of each of the driving parts 120. The first contact unit 123 of the driving part 120 is provided on one side of the panel unit 122 to be connected to the body part 110. The first contact unit 123 is provided to be connected to, for example, a support body 112, or the like.

The first contact unit 123 is provided in the form of a universal joint. The second contact unit 124 of the driving part 120 is provided on the opposite side of the panel unit 122 to be connected to the body part 110.

The second contact unit 124 is connected to, for example, an auxiliary support body 113 adjacent to the support body 112. The second contact unit 124 is provided on the opposite side of the panel unit 122.

Further, the second contact unit 124 is provided in the form of a universal joint. The connection block 125 of the driving part 120 is provided to interwork with the in-wheel motor module 121. The moving shaft unit 126 of the driving part 120 is provided to interwork with the driving part 130.

The moving shaft unit 126 is provided to vertically move the connection block 125 using a ball-screw mechanism based on the actuation force from the actuating part 130. In this case, the spring unit is provided on an outer circumferential surface of the moving shaft unit 126. The spring unit 127 is located between the panel unit 122 and the connection block 125.

The spring unit 127 may be moved by the connection block 125 based on the actuation force of the actuating part 130. For example, the spring unit 127 contracts and enters a compressed state as the connection block 125 moves upward of the moving shaft unit 126.

Here, the spring unit 127 is in a relaxed state through its elasticity as the connection block 125 moves downward of the moving shaft part 126 based on the actuation force of the actuating part 130.

When the actuating part 130 moves the connection block 125 and the in-wheel motor module 121 downward, the spring unit 127 assists in the downward movement based on the relaxed state due to elasticity.

In addition, the vertical connection unit 1281 of the movement restricting body 128 is connected to and located below the panel unit 122. The horizontal connection unit 1282 of the movement restricting body 128 extends horizontally from the vertical connection unit 1281.

The horizontal connection unit 1282 is installed on a lower end of the moving shaft unit 126 to restrict the movement of the connection block 125. The driving apparatus 100 may encounter a situation in which an unforeseen irregular obstacle appears on the driving route while driving along the driving route.

Figure 6:
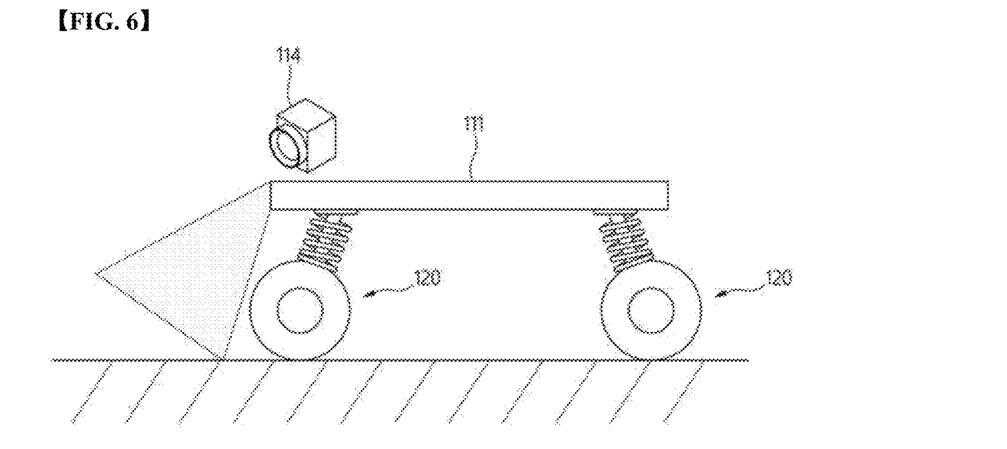
FIGS. 6 and 7 are diagrams illustrating an obstacle sensing state of the configuration according to FIG. 1.
Figure 7:
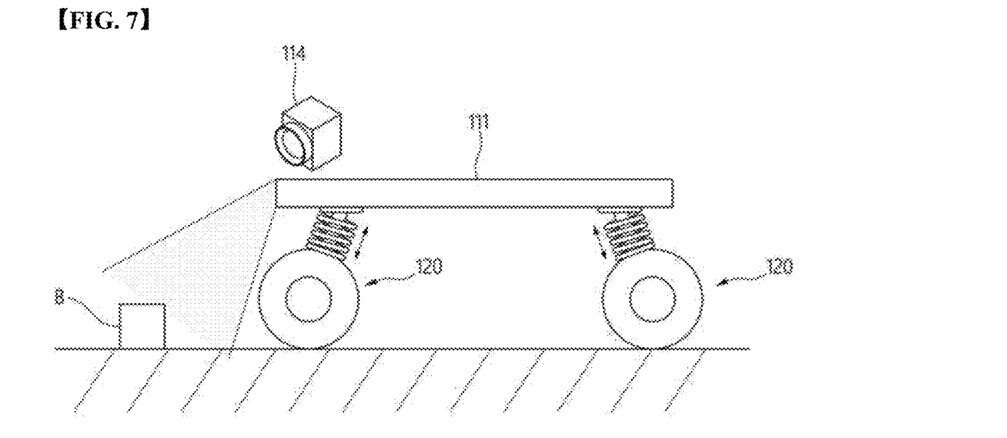

Referring to FIGS. 2, 6, and 7, a vision sensor module 114 predicts an impact value produced by an irregular obstacle B based on a preset database and generates obstacle impact information.

The information collection part 140 provides vibration cancellation information based on the obstacle impact information. The driving part 120 performs a second response operation for shock reduction corresponding to the irregular obstacle on the basis of the vibration cancellation information.

Furthermore, the second response operation of the driving part 120 may include a 2-1 response operation and 2-3 response operation. The 2-1 response operation includes an operation in which the in-wheel motor module 121 approaches the body part 110 based on the compressed state.

The 2-2 response operation includes an operation in which the in-wheel motor module 121 moves way from the body part 110 based on the compressed state. A lower plate unit 111 of the body part 110 is provided in a preset standard.

Meanwhile, the support body 112 of the body part 110 is bar-shaped and one or more body parts 110 are provided on the lower plate unit 111 in a vertical direction. An upper plate unit 115 of the body part 110 is provided above the lower plate unit 111 via the support body 112.

The driving parts 120 are disposed respectively on edge portions and the like of the lower plate unit 111. The upper plate unit 115 is provided to prevent interference in the lower plate unit due to the movement of the driving parts 120.

To this end, the upper plate unit 115 is provided such that regions facing the driving parts 120 are spaced upward from the driving parts 120 with a set range. That is, the upper plate unit 115 is provided to ensure a distance to the driving parts 120.

The information collection part 140 is positioned on the upper plate unit 115 of the driving apparatus 100. The control part 150 is provided on the lower plate unit 111 and performs the overall control of the driving apparatus 100. The lower plate unit 111 is provided with the vision sensor module 114 in advance and/or behind the driving direction.

Figure 8:
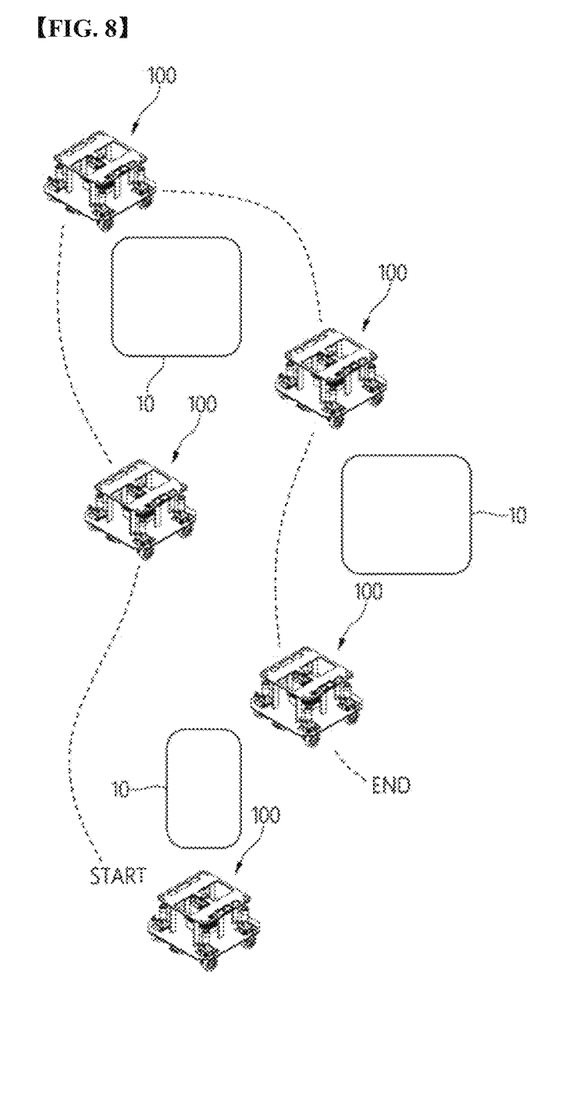
FIG. 8 is a diagram illustrating an obstacle sensing state of the configuration according to FIG. 1.

Referring to FIGS. 2 and 8, the driving apparatus 100 preliminarily drives a driving route on which obstacles exist. The vibration information is obtained from the driving route according to the preliminary driving.

Figure 9:
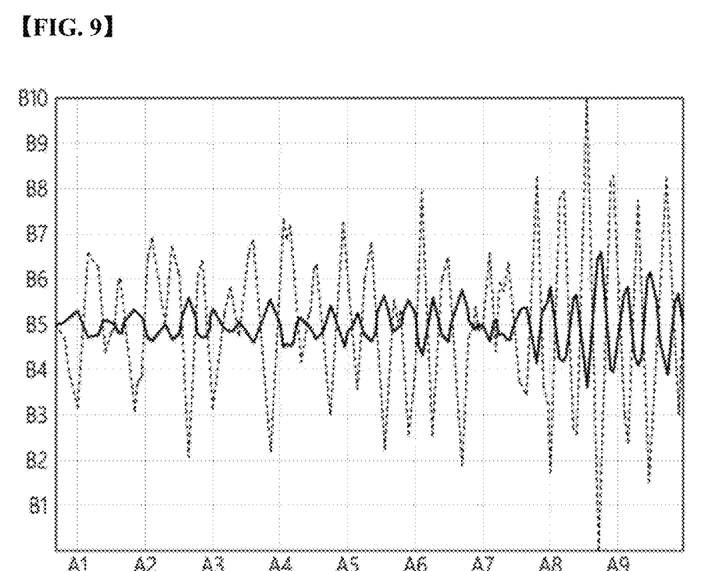
FIG. 9 is a graph showing an example of vibration information according to the present disclosure.

The first adjustable operation, the second adjustable operation, and the like are performed to correspond to the vibration cancellation information while driving the driving route corresponding to the preliminary driving. Referring to FIG. 9, the vibration information of the driving route may be generated by collecting vibration data according to the preliminary driving.

Figure 10:
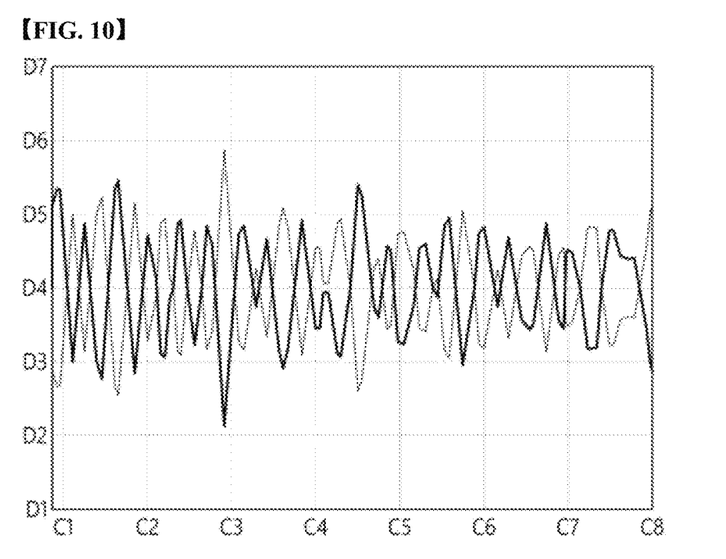
FIG. 10 is a graph showing an example of vibration cancellation information according to the present disclosure.
Figure 11:
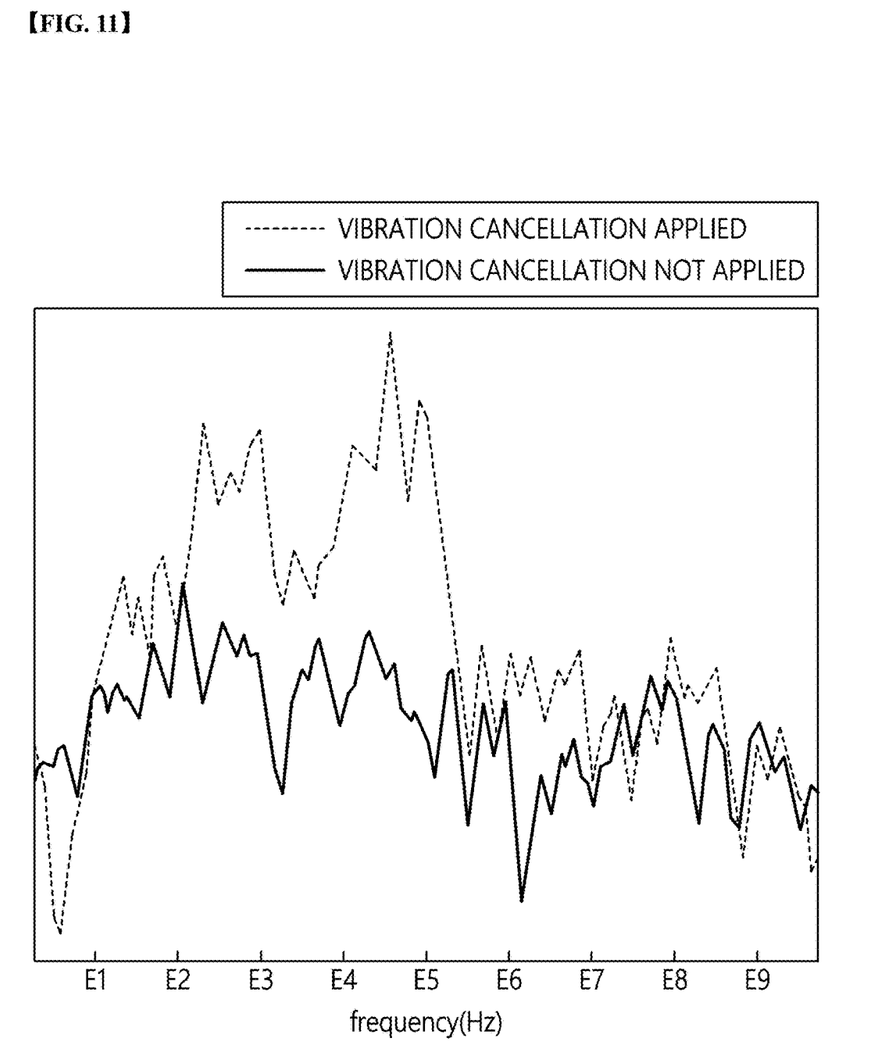
FIG. 11 is a graph showing whether vibration cancellation information is applied or not according to the present disclosure.

Referring to FIG. 10, the vibration cancellation information for canceling the vibration may be obtained. Referring to FIG. 11, results according to the application of the vibration cancellation information for the vibration information can be seen.

Figure 12:
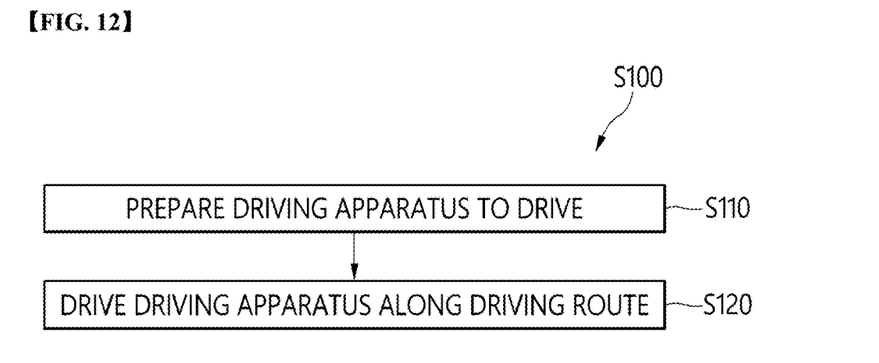
FIG. 12 is a flowchart sequentially illustrating a method of operating a driving apparatus according to an embodiment of the present disclosure.

Referring to FIG. 12, in a method S100 of operating a driving apparatus 100 according to an embodiment of the present disclosure, the driving apparatus 100 is ready to drive (S110). Then, the driving apparatus 100 starts driving a driving route (S120).

Here, the driving apparatus 100 operates such that the driving parts 120 drive the body part 110 along the driving route. The actuating parts 130 of the driving apparatus 100 provides an actuation force to the driving parts 120 to drive the body part 110.

The information collection part 140 of the driving apparatus 100 collects vibration information on vibrations produced on the driving route according to the driving of the driving parts 120. The information collection part 140 provide vibration cancellation information to cancel the vibrations produced on the driving route based on the vibration information.

Further, a plurality of driving parts 120 are provided on the body part 110. The driving parts 120 perform a first response operation in the body part 110 to respond to the vibrations on the driving route on the basis of the vibration cancellation information. The driving apparatus is operated to handle distribution (e.g., semiconductor substrate and the like) inside a clean room or the like.

According to the driving apparatus and the operating method thereof in accordance with the present disclosure, there are one or more of the following effects.

The driving apparatus may actively respond to the state of a driving route while driving.

In particular, driving optimized for the ground state of the driving route is enabled, thereby canceling the shocks produced during the driving.

Further, driving at various speeds ranging from low speed to high speed is enabled.

Moreover, even in the event of an unforeseen irregular obstacle, a quick response to such an event is enabled and thus stable driving is possible while responding to unexpected circumstances.

Furthermore, the driving apparatus may be provided with a structure specialized to prevent physical interference with other components caused by adjustable operations (e.g., rolling, yawing, pitching, and the like) of a driving means for shock cancellation during driving.

The foregoing description of the present disclosure is for illustrative purposes, a person having ordinary skilled in the art will appreciate that other specific modifications can be easily made without departing from the technical spirit or essential features of the invention. Therefore, the foregoing embodiments should be regarded as illustrative rather than limiting in all aspects.

What is claimed:

1. A driving apparatus comprising:
    a body part;
    driving parts configured to drive the body part along a driving route;
    actuating parts configured to provide an actuation force to the driving parts to drive the body part; and
    an information collection part configured to collect vibration information based on vibrations produced on the driving route according to driving of the driving parts, wherein the information collection part is configured to provide vibration cancellation information for canceling the vibrations produced on the driving route and a plurality of driving parts are provided on the body part and perform a first response operation in the body part to respond to the vibrations on the driving route on the basis of the vibration cancellation information, the vibration cancellation information being based on the vibration information, wherein each of the driving parts comprises an in-wheel motor module, a connection block, and a moving shaft unit that are configured to interwork with one another,
    wherein the in-wheel module is directly connected to the connection block, the connection block surrounds the moving shaft unit, and the connection block is actuated upward and downward along the moving shaft unit by the actuation force of one of the actuating parts, and
    wherein the moving shaft unit vertically moves the connection block based on the actuation force of the one of the actuating parts using a ball-screw mechanism.

2. The driving apparatus of claim 1, wherein the information collection part is configured to: collect the vibration information in a three-dimensional manner, collect the vibration information at a preset period, and generate the vibration cancellation information based on the vibration information.

3. The driving apparatus of claim 1, wherein at least four driving parts are provided in the body part and individually move to perform the first response operation based on the vibration cancellation information in order to reduce the vibrations produced on the driving route.

4. The driving apparatus of claim 3, wherein
the actuating parts are configured to provide a torque-based actuation force, and
the driving parts:
are in contact with a ground of the driving route, and
change their positions based on the actuation force.

5. The driving apparatus of claim 4, wherein the driving parts are configured to perform a first adjustable operation, including a rolling operation, a yawing operation, and a pitching operation, based on the actuation force of the actuating parts and the in-wheel motor module performs a second adjustable operation corresponding to the first adjustable operation on the basis of the vibration cancellation information provided by the information collection part.

6. The driving apparatus of claim 5, wherein the information collection part is configured to generate the vibration cancellation information that includes a machine learning-based algorithm in order to correspond to the vibration information and the actuating parts are configured to provide the actuation force such that the first adjustable operation of the driving pats is performed based on the vibration cancellation information.

7. The driving apparatus of claim 5, wherein the body part includes a plurality of hollow regions, the driving parts are located in the hollow regions and perform the first adjustable operation and the second adjustable operation, and the driving parts each comprise a panel unit in which the actuating part is located, a first contact unit provided on one side of the panel unit to be connected to the driving part and provided in the form of a universal joint, and a second contact unit provided on an opposite side of the panel unit to be connected to the driving part and provided in the form of a universal joint.

8. The driving apparatus of claim 7, wherein
an entirety of the moving shaft unit is threaded in a screw-like manner,
a spring unit is provided on an outer circumferential surface of the moving shaft unit, and
the spring unit is located between the panel unit and the connection block, contracts and enters a compressed state as the connection block moves upward of the moving shaft unit, and is in a relaxed state as the connection block moves downward of the moving shaft part based on the actuation force of the actuating part.

9. The driving apparatus of claim 8, wherein when the actuating part moves the connection block and the in-wheel motor module downward, the spring unit assists in the downward movement based on the relaxed state.

10. The driving apparatus of claim 8, wherein the driving parts each further comprise a movement restricting body comprising a vertical connection unit is connected to and located below the panel unit and a horizontal connection unit extending horizontally from the vertical connection unit and installed on a lower end of the moving shaft unit to restrict the movement of the connection block.

11. The driving apparatus of claim 8, further comprising a vision sensor module configured to, in an event of occurrence of an unforeseen irregular obstacle on the driving route during driving of the driving apparatus, predict an impact value produced by the irregular obstacle and generate obstacle impact information, wherein the information collection part is configured to provide vibration cancellation information based on the obstacle impact information, the driving parts perform a second response operation for shock reduction corresponding to the irregular obstacle based on the vibration cancellation information.

12. The driving apparatus of claim 11, wherein the second response operation of the driving parts includes a 2-1 response operation in which the in-wheel motor module approaches the body part based on the compressed state and a 2-2 operation in which the in-wheel motor module moves away from the body part based on the compressed state.

13. The driving apparatus of claim 7, wherein the body part comprises a lower plate unit, one or more support bodies on the lower plate unit, and an upper plate unit provided above the lower plate unit via the support bodies and the driving parts are disposed on edge portions of the lower plate unit, respectively.

14. The driving apparatus of claim 13, wherein the upper plate unit is provided such that regions facing the driving parts are spaced upward from the driving parts 120 with a set range to ensure a distance to the driving parts in order to prevent interference caused by movement of the driving parts on the lower plate unit.

15. The driving apparatus of claim 13, wherein the information collection part is located on the upper plate unit, a control part for controlling the driving apparatus is located at a center of the lower plate unit, and the lower plate unit is provided with a vision sensor module in advance and/or behind a driving direction.

16. A driving apparatus comprising:
a body part;
driving parts configured to drive the body part along a driving route;
actuating parts configured to provide an actuation force to the driving parts to drive the body part; and
an information collection part configured to collect vibration information on vibrations produced on the driving route according to driving of the driving parts,
wherein the information collection part is configured to provide vibration cancellation information to cancel the vibrations produced on the driving route and a plurality of driving parts are provided on the body part and perform a first response operation in the body part to respond to the vibrations on the driving route on the basis of the vibration cancellation information,
wherein the vibration cancellation information is based on the vibration information,
wherein each of the driving parts comprises an in-wheel motor module, a connection block, and a moving shaft unit that are configured to interwork with one another,
wherein the in-wheel module is directly connected to the connection block, the connection block surrounds the moving shaft unit, and the connection block is actuated upward and downward along the moving shaft unit by the actuation force of one of the actuating parts,
wherein the information collection part is configured to collect the vibration information in a three-dimensional manner, collect the vibration information at a preset period, and generate the vibration cancellation information, wherein at least four driving parts are provided in the body part and individually move to perform the first response operation based on the vibration cancellation information in order to reduce the vibrations produced on the driving route, wherein the actuating parts are configured to provide a torque-based actuation force and the driving parts are in contact with a ground of the driving route and change their positions based on the actuation force, wherein the driving parts perform a first adjustable operation, including a rolling operation, a yawing operation, and a pitching operation, based on the actuation force of the actuating parts and the in-wheel motor module performs a second adjustable operation corresponding to the first adjustable operation on the basis of the vibration cancellation information provided by the information collection part, wherein the information collection part is configured to generate the vibration cancellation information that includes a machine learning-based algorithm in order to correspond to the vibration information and the actuating parts are configured to provide the actuation force such that the first adjustable operation of the driving pats is performed based on the vibration cancellation information, wherein the body part includes a plurality of hollow regions, the driving parts are located in the hollow regions and perform the first adjustable operation and the second adjustable operation, and the driving parts each comprise a panel unit in which the actuating part is located, a first contact unit provided on one side of the panel unit to be connected to the driving part and provided in the form of a universal joint, and a second contact unit provided on an opposite side of the panel unit to be connected to the driving part and provided in the form of a universal joint, wherein the moving shaft unit vertically moves the connection block based on the actuation force of the one of the actuating parts using a ball-screw mechanism, a spring unit is provided on an outer circumferential surface of the moving shaft unit, and the spring unit is located between the panel unit and the connection block, contracts and enters a compressed state as the connection block moves upward of the moving shaft unit, and is in a relaxed state as the connection block moves downward of the moving shaft part based on the actuation force of the actuating part, wherein when the actuating part moves the connection block and the in-wheel motor module downward, the spring unit assists in the downward movement based on the relaxed state, wherein the driving parts each further comprise a movement restricting body including a vertical connection unit is connected to and located below the panel unit and a horizontal connection unit extending horizontally from the vertical connection unit and installed on a lower end of the moving shaft unit to restrict the movement of the connection block, wherein the driving apparatus further comprises a vision sensor module configured to, in an event of occurrence of an unforeseen irregular obstacle on the driving route during driving of the driving apparatus, predict an impact value produced by the irregular obstacle and generate obstacle impact information, wherein the information collection part is configured to provide vibration cancellation information based on the obstacle impact information, the driving parts perform a second response operation for shock reduction corresponding to the irregular obstacle based on the vibration cancellation information, wherein the second response operation of the driving parts includes a 2-1 response operation in which the in-wheel motor module approaches the body part based on the compressed state and a 2-2 operation in which the in-wheel motor module moves away from the body part based on the compressed state, wherein the body part comprises a lower plate unit, one or more support bodies on the lower plate unit, and an upper plate unit provided above the lower plate unit via the support bodies and the driving parts are disposed on edge portions of the lower plate unit, respectively.

17. A method of operating a driving apparatus, comprising:

driving a driving apparatus along a driving route, wherein the driving apparatus comprises: a body part; driving parts configured to drive the body part along a driving route; actuating parts configured to provide an actuation force to the driving parts to drive the body part; and an information collection part configured to collect vibration information on vibrations produced on the driving route according to driving of the driving parts, wherein the information collection part is configured to provide vibration cancellation information for canceling the vibrations produced on the driving route and a plurality of driving parts are provided on the body part and perform a first response operation in the body part to respond to the vibrations on the driving route on the basis of the vibration cancellation information, wherein each of the driving parts comprises an in-wheel motor module, a connection block, and a moving shaft unit that are configured to interwork with one another, and wherein the in-wheel module is directly connected to the connection block, the connection block surrounds the moving shaft unit, and the connection block is actuated upward and downward along the moving shaft unit by the actuation force of one of the actuating parts, and wherein the driving apparatus is operated in a controlled environment, and wherein the moving shaft unit vertically moves the connection block based on the actuation force of the one of the actuating parts using a ball-screw mechanism.

18. The method of claim 17, wherein the information collection part is configured to: collect the vibration information in a three-dimensional manner, collect the vibration information at a preset period, and generate the vibration cancellation information based on the vibration information.

19. The method of claim 18, wherein at least four driving parts are provided in the body part and individually move to perform the first response operation based on the vibration cancellation information in order to reduce the vibrations produced on the driving route.

20. The method of claim 19, wherein the actuating parts are configured to provide a torque-based actuation force, and the driving parts:

are in contact with a ground of the driving route, and change their positions based on the actuation force.

* * * * *